United States Patent [19]

Schloss et al.

[11] Patent Number: 5,895,579

[45] Date of Patent: Apr. 20, 1999

[54] ADJUSTABLE INLET FOR WASTE WATER TREATMENT APPARATUS

[76] Inventors: Charles M. Schloss, 801 E. Radcliffe Ave., Cherry Hills Village, Colo. 80110; Charles E. Snyder, 2055 Oswego St., Aurora, Colo. 80010-1619

[21] Appl. No.: 09/110,534

[22] Filed: Jul. 6, 1998

[51] Int. Cl.⁶ .............................. E02B 5/08; B01D 35/02
[52] U.S. Cl. .................... 210/767; 210/162; 210/747; 210/170; 405/87; 405/90
[58] Field of Search .................... 210/159, 154, 210/162, 170, 767, 747; 405/87, 90, 91, 92

[56] References Cited

U.S. PATENT DOCUMENTS

| 207,955 | 9/1878 | Downs . |
| 320,545 | 6/1885 | Doughton . |
| 1,006,730 | 10/1911 | Dougherty . |
| 1,348,554 | 8/1920 | Dringman . |
| 1,920,158 | 7/1933 | Albertson . |
| 1,966,628 | 7/1934 | Johnson . |
| 2,025,722 | 12/1935 | Camp . |
| 2,199,788 | 5/1940 | Durdin . |
| 2,291,121 | 7/1942 | Tolman . |
| 3,190,448 | 6/1965 | Johnston . |
| 5,795,467 | 8/1998 | Schloss . |

*Primary Examiner*—Thomas M. Lithgow
*Attorney, Agent, or Firm*—Gibson, Dunn & Crutcher LLP

[57] ABSTRACT

A method and apparatus for controlling the fluid flow through a waste fluid inlet channel, such as for a sewage treatment plant, includes a weir that may be inserted into the channel. The weir may be one or more plates that serve to reduce the effective cross section of the channel. The plates may be shaped so that the channel is more restricted at greater depths, or may be combined to form such other shape, in order to provide desirable flow patterns. Plates may be added, removed, or exchanged with different sized plates, to accommodate a range of fluid volume at a desired flow rate. The plates may combine with a bar rack, and will not interfere with the cleaning thereof. The plates may be positioned to allow grit to flow through without impediment.

22 Claims, 2 Drawing Sheets

5,895,579

ADJUSTABLE INLET FOR WASTE WATER TREATMENT APPARATUS

FIELD OF THE INVENTION

The present invention relates to the field of inlets for waste water treatment apparatus, and more particularly to an inlet including a weir or weirs to adjust the cross section of the inlet and thereby control the flow rate therethrough.

BACKGROUND OF THE INVENTION

Efficient operation of a waste fluid plant, such as for sewage treatment, requires control over the fluid flow rate over a wide range of flow volumes. The flow volumes typically vary by about 3:1 between peak and minimum flows. Further, the overall flow through a plant may expand considerably over the operating life of a plant, because of, for example, growth in the areas served by the plant. Good design requires that a plant be able to accommodate fluid levels of perhaps two to three times initial anticipated peak and minimum flows.

Fluid control is particularly important in relation to screening equipment, such as a bar rack composed of a plurality of spaced bars that acts as an initial screening device to trap and remove relatively large debris from the waste fluid inlet channel. If the flow rate is too high (greater than about 3.28 feet per second), the debris that desirably is trapped by the rack aligns with the fluid stream and is forced through the rack, thereby fouling subsequent treating apparatus and causing environmental and other problems.

Conversely, the fluid flow should not be too low (less than about 1.25 feet per second). This is because the fluid often contains smaller waste, generally termed "grit," composed of material such as sand, gravel, small rocks, degraded concrete and tile sewer pipe. This grit is too small to be intercepted by the rack, and is intended to pass therethrough for subsequent removal. If the fluid velocity becomes too low, the grit will settle within the channel, smell badly, interfere with the operation of the bar screen and, over time, reduce the volumetric capacity of the channel to such an extent that some form of cleaning is required.

For the above reasons, it is desirable to control the velocity of fluid through a waste water treatment plant, and particularly at the location of screen apparatus. The initial design choice of channel width and depth is not easily changeable, once the channel has been constructed. Downstream regulating devices, such as, for example Parshall flumes, Sutro weirs, and Camp flow regulators, may be used to control the depth of water flow and thus its velocity. Other devices are known that in some way control water flow. For example, U.S. Pat. No. 3,926,805 of Walker describes a gate inlet system with a tangential gate that imparts a rotational flow to water of a waste treatment plant. U.S. Pat. No. 4,167,358 of Besha describes an inflatable bladder that may be selectively deployed to block an open culvert. U.S. Pat. No. 4,300,858 of Zintz et al. describes a variable dam including a plurality of plates that may be rotated into or out of a stream path. U.S. Pat. No. 5,378,376 of Zenner describes a sludge collector that has an adjustable weir to match the rate of flow into the collector and rate of flow out of the collector.

None of the known prior art devices and methods provide a simple method to vary flow rates over both short and long term fluctuations, with a minimum of moving parts. Further, none of the known prior art devices are specifically adapted for use with a bar rack; the prior art devices may thus interfere with the cleaning operation used in conjunction with bar racks.

The present invention is in some ways similar to the invention described in U.S. patent application Ser. No. 08/735,525, issue fee paid Apr. 29, 1998, the contents of which are incorporated by reference. The present invention describes alternative and additional structural arrangements to accomplish broadly the objectives of the Ser. No. 08/735,535 application.

It should be understood that nothing herein is admitted to be prior art, but is only mentioned to help place the present invention in context.

SUMMARY OF THE INVENTION

The present invention is a method and device to control the velocity of waste fluid through an inlet channel, such as at a bar rack filtering apparatus. The fluid velocity must be maintained through the rack within an appropriate range. If the velocity is too fast, both small and large debris may be forced through the bar rack, the debris being more desirably intercepted. If the velocity is too slow, debris as well as grit and other substances contained within the fluid may settle and eventually clog the channel.

The velocity must be maintained within the desired range even though the quantity of water will increase from minimum to peak values on a regular basis; and the overall quantities of water through the channel may increase (or decrease) over the life of the water treatment plant as, for example, the community served by a water treatment plant grows (or shrinks).

The present invention includes at least one weir that may be inserted into the channel. The weir includes a plate that partially blocks the channel, and thus reduces the effective cross section of the channel. The weir is preferably detachably attachable; in operation, the weir is inserted when fluid volume decreases, and is removed when fluid volume increases. Multiple weirs may be used. In one embodiment, weirs are placed symmetrically about the center of the channel to maintain symmetrical flow.

A modular weir design according to the present invention allows multiple plates to be individually added and removed as necessary to control the velocity through the channel. The size and number of individual plates may be selected so as to provide as much selectivity in controlling the cross section as desired. The weir plates may combine to present a hydrodynamic aspect that results in desirable flow patterns through the channel.

The weir plates may advantageously cooperate with the bar rack. The plates are attachable to the rack, thereby stabilizing the plates' position within the channel. The plates may be attached directly to the rack or spaced away therefrom, and may be attached upstream or downstream from the rack, to accommodate a variety of rack cleaning devices.

DETAILED DESCRIPTION OF THE INVENTION

Figure 1:
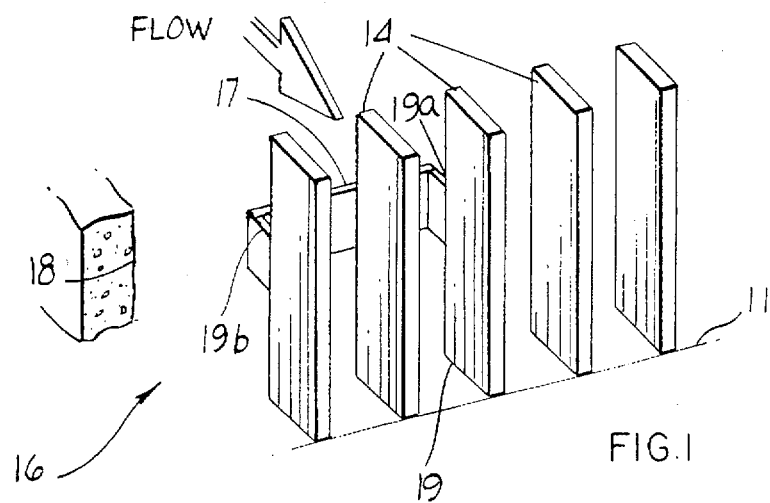
FIG. 1 is a perspective of an embodiment of the present invention along with a bar rack.

Many waste treatment facilities include a bar rack as the initial treating mechanism. The waste fluid to be treated is contained within an inlet such as a channel containing one or more bar racks. The bar rack is a series of bars with clear openings between the bars, and acts as a sieve to trap relatively large solid debris from the water, such as tissue, paper, plastic, etc. The trapped debris may be removed from the bar rack from time to time by cleaning rakes or other appropriate methods. Smaller debris, called grit, is allowed to pass through the bar rack for removal in subsequent downstream treatment operations. Grit is composed of materials as, for example, sand, gravel, small rocks, and degraded parts of concrete and tile sewer pipe. The effectiveness of the bar rack in filtering out such debris requires that the flow velocity be within a minimum and maximum range.

If the flow velocity through the inlet channel is too low (less than about 1.25 feet per second (0.38 meters per second)), grit and fecal matter contained within the waste fluid, and possibly the larger debris, will settle onto the channel floor. This settled material reduces the volumetric capacity of the channel and, over time, may eventually clog the inlet, as well as interfere with proper rake operation. Settled fecal material causes additional problems, as it tends to decompose and release offensive, toxic, and even explosive gases. Thus, the settled material must be flushed out of the channel from time to time, such as by somehow increasing the flow velocity to re-suspend the settled material, in order to maintain acceptable capacity and flow rates. A channel design that allows for a constant flow rate above 1.25 feet per second significantly reduces the need to flush out the channel, and so provides for more reliable and economical operation.

The velocity of waste fluid must also be controlled so that it is not too high, and should be limited to about 3.28 feet per second (1 meter per second). If the flow rate exceeds this number, the debris that desirably would be trapped by the bar rack becomes aligned with the stream lines and passes through the bar rack, thereby defeating the purpose of the bar rack. The debris may then cause blockage and other maintenance problems with the operation of the treatment plant, or may pass through the treatment plant and cause pollution and environmental problems downstream from the plant.

The primary variable of the inlet channel flow rate is the cross sectional area of the channel, that is, its width and depth. As inlet channels are commonly made of concrete or similar material, it has heretofore been difficult, if not impossible, to modify the channel width and depth parameters after the channel has been constructed. Adding to the difficulty of channel design is the fact that flow rates will vary somewhat depending on rainfall, patterns of water usage, and other water control factors. The inlet must be able to provide acceptable flow rates over the range of minimum to peak flows that may be transported through the channel; typically the peak flow is about three times that of the minimum flow. As well as fluctuations resulting from rainfall and short term fluctuations, flow rates may vary over longer periods of time, such as an increase in flow rates resulting from the growth of an area served by the waste water treatment plant. Future growth must be contemplated when a waste water treatment plant is constructed, or else the plant may not be able to satisfactorily handle the increased flows. Typically, increased flow demands of about two or three times should be provided for in the construction of a waste water treatment plant.

Referring now to FIG. 1, a perspective view of a typical bar rack 14 formed of a series of spaced vertical bars with clear openings therebetween is shown. A weir 16 is mounted upstream of the bar rack (as seen by reference to the flow arrow). The weir 16 is adapted for use with a back cleaning component (not shown). An example of a back cleaning component is a rake that travels up the rack with teeth extending through the clear openings to lift debris trapped by the front surface of the rack to deposit the debris in a suitable collecting bin. The body of the rake would be behind the rack (hence the term "back cleaned"), with the teeth projecting upstream.

The weir includes a transverse panel 17 that may be substantially parallel to the bar rack (and thus has a transverse component to the panel). The weir is spaced upstream from the bar rack by spacing members 19a and 19b, each of which may connect to one or more of the bars of the bar rack 14. The width of the panel 17 could be greater than shown, i.e., greater than the distance between the spacing members 19a and 19b.

Figure 2:
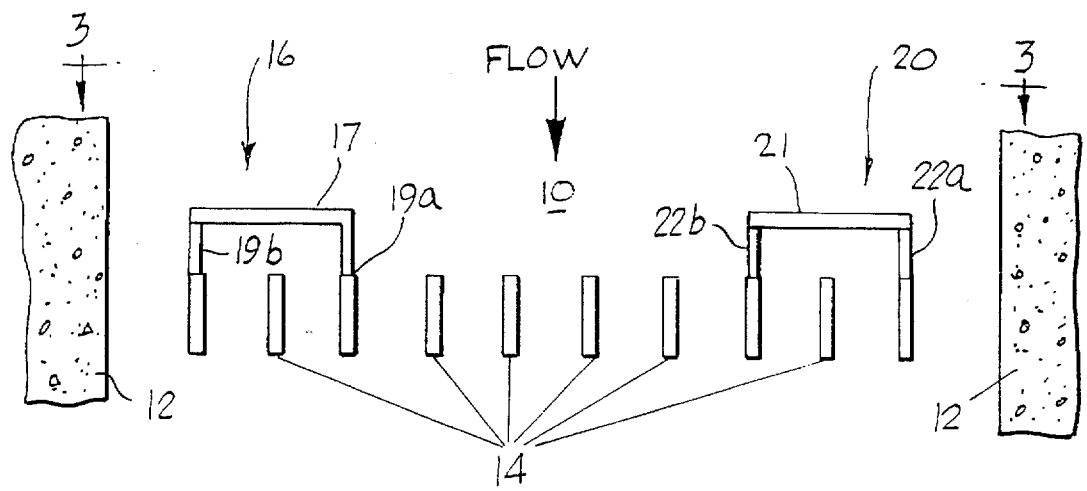
FIG. 2 is a top plan view of an embodiment of the present invention, including a bar rack, situated within a fluid flow channel.
Figure 3:
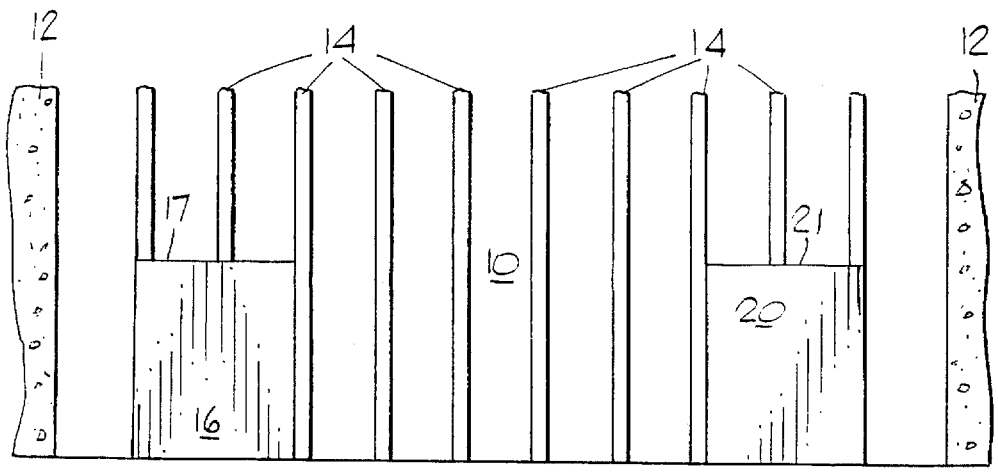
FIG. 3 is a front elevation view taken along the line 3—3 of FIG. 2.

Referring to FIGS. 2 and 3, the bar rack 14 and weir 16 are shown positioned in a waste water fluid channel 10 in a plan view and a sectional view respectively. Additionally, a second weir 20 is mounted on the opposite side of the bar rack 14 from the first weir 16. As explained below, the invention may be functional without the additional weir 20, or in other configurations. The second weir 20 has a transverse plate 21 similar to the transverse plate 17. The plate 21 is spaced upstream from the bar rack 14 by spacing panels 22a and 22b, each of which may connect to one of the bars of the bar rack 14. As with the transverse panel 17, the transverse panel 21 may vary in width. The length of the spacing members 19 and 22 may vary, depending upon the application. They most preferably have sufficient length to accommodate the teeth of cleaning rake. However, depending upon the application, one or both the panels 17, 20, could be attached directly to a bar of the bar screen 14 without including a spacing member.

Referring to FIG. 3, it can easily be seen that the weirs 16 and 20 reduce the effective cross section of the channel 10. The fluid flow parameters, such as velocity and capacity, through channel 10 will be accordingly affected. The fluid channel 10, with the presence of the weirs 16 and 20, may provide acceptable fluid flow rates for a selected volume of water. As the flow rate increases, the water depth increases and may reach the upper edge of the weir, thereby increasing the area available for flow and lowering the velocity of further increasing flow. Also, when the fluid volume increases, it may be desirable to remove one of the weirs, so that the fluid flow rates are maintained within the desired operating parameters. Still further increases in fluid flow rates may be accommodated by removing the other weir. Further, eccentric flow patterns in the channel, such as those caused by off-center feeding of water, may be corrected by use of more weir area being used on one side than the other.

The fluid flow may decrease as well as increase. In that event, one or more weirs that have been removed may be reinstalled, so that again the fluid flow may be maintained within the desired operating parameters. Thus, adjusting the size and number of weirs may accommodate fluid flows of greater or lesser amounts or correct flow direction. The operation of the bar rack 14 is not affected by the presence or absence of the weirs, as they do not interfere with the clear spaces between the bars of the bar rack.

Figure 4:
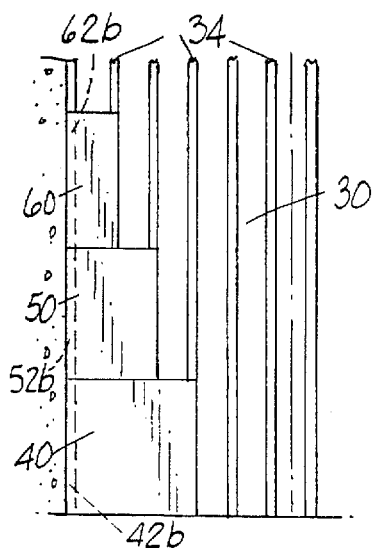
FIG. 4 is a front elevation view of an embodiment of the present invention including modular plates.
Figure 5:
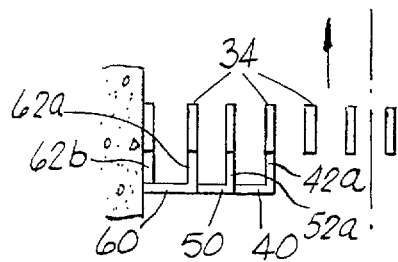
FIG. 5 is a top plan view of an embodiment of the present invention similar to that depicted in FIG. 3.

Another embodiment of the invention is shown in the front elevation view of FIG. 4. A system of modular weir plates may be used to adjustably control the effective cross section of a fluid treatment channel 30, containing a bar rack 34. A first weir plate 40 may be inserted into the channel to partially reduce the cross section of the channel. As with the previous embodiment, the weir plate 40 is for use with a back cleaned bar rack. Therefore, the weir plate 40 is positioned upstream of the bar rack 34 by connecting to a spacing member 42a and 42b that are in turn connected to the bars of the bar rack (see also FIG. 5). The weir plate 40 may extend a selected distance from one side of the channel towards the center of the channel.

When the flow through the channel 30 increases, a second weir plate 50 may be added. The second weir plate 50 may seat onto the top of the weir plate 40, and extend upwards therefrom. The second weir plate cooperates with the weir plate 40 to further restrict the cross section of the channel 30. As shown in FIG. 4, the second weir plate 50 does not extend as far into the channel as does the first weir 40. The edge of the second weir plate 50 that extends into the channel may be connected to a bar of the bar rack 34 so that the weir plate 50 is stabilized. The weir plate 50 is attached to bars of the bar rack 34 by spacing members 52a and 52b. The reduced width of the second weir plate 50 as compared with the first weir plate 40 may result in more desirable fluid flow patterns than if the second weir 50 extended as far into the channel 30 as the first weir plate 40. The combination of plates 50 and 40 form a chamfered cross section, as may be desirable in a water channel. However, as an alternate design, the second weir plate could extend as far into the channel as the first weir plate (or even farther).

A third weir plate 60 may be added on top of the weir plate 50, to still further increase the effective cross section of the channel 30 for greater water depths. The weir plate 60 does not extend as far into the channel as the weir plate 50, to continue the chamfered cross section of the channel 30. If fluid volume should increase, any or all of the weir plates 40, 50, and 60 may be removed preferably in the reverse order that they were added, to maintain the desired fluid operating parameters. The weir plate 60 is attached to bars of the bar rack 34 by spacing members 62a and 62b. While three modular plates have been described, it should be readily apparent that a modular weir system including fewer or more plates could be constructed and used in the same manner, the arrangement of wider and narrower plates may be modified, and are alternative embodiments of the present invention.

Any of a number of different methods may be used to connect the weir plates to the channel sidewall, the bar rack, and each other. Examples of such methods are welding, tongue and groove connectors, clamps, and bolts. Since the weir plates are preferably removable depending upon the volume of fluid contained within the channel 34, the fastening method chosen should not be overly time consuming to make.

The above embodiment has been described with reference to one side of the channel 30. Of course, the channel 30 has an opposite side. The opposite side of the channel preferably contains identical weir plates that are modularly attachable and detachable. Therefore, the fluid flow through the channel 30 will be symmetrical about the center of the channel, which may be desirable so that debris accumulates symmetrically on the rack 34 and for other reasons. However, the system may only include modular plates on only one side of the channel.

Figure 6:
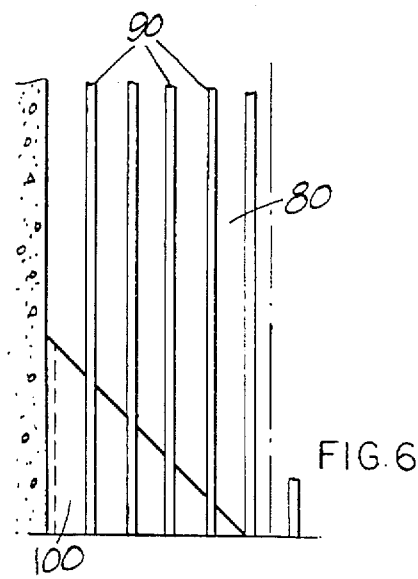
FIG. 6 is a front elevation view of an embodiment of the present invention with a triangular shaped plate to provide a desired hydrodynamic flow.

Referring to FIG. 6, another embodiment of the present invention is illustrated in a front elevation view. A front cleaned bar rack 90 is situated within a fluid channel 80. A weir plate 100 is mounted downstream from the bar rack. The downstream mounting allows for cleaning by a front rake or other cleaning device that enters the bar rack from the upstream side of the rack 90. The weir plate 100 has a surface area sufficient to reduce to the cross section of the channel a desired amount; the actual size will vary with the application. While the weir plate 100 may be of many different shapes, the right triangle shape as shown in FIG. 6 provides good fluid flows. The other leg may mount on the side of the channel. The hypotenuse of the weir plate 100 will then extend between the side of the channel and the bottom of the channel, so that the weir plate 100 extends further towards the center of the channel at the bottom of the weir plate than it does towards the top of the plate, resulting in a desirable flow pattern. However, many other shapes of weir plate may be used with good results. The weir plate 100 is preferably removably attached to the bar screen, such as by any of the attaching means previously described.

Figure 7:
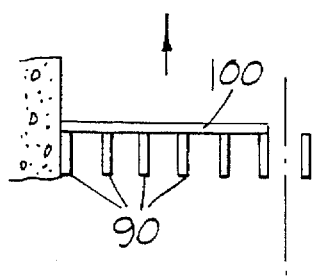
FIG. 7 is a top plan view of an embodiment of the invention with a plate mounted directly to a bar rack.
Figure 8:
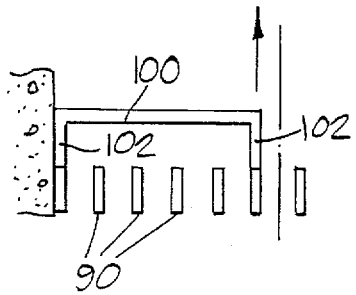
FIG. 8 is top plan view of an embodiment of the invention with a plate spaced away from a bar rack.

The weir plate 100 may be attached directly to the bar rack 90, as shown in the plan view of FIG. 7. Thus, the plate 100 directly contacts some of the bars. Alternatively, the weir plate may be spaced from the bar rack 90, as shown in FIG. 8. This may be accomplished by spacing members 102 that attach to the bar rack 90 and extend to the weir plate 100. The separation may be useful to allow cleaning apparatus such as the teeth of a cleaning rake to penetrate the bars of the bar rack 90, and to extend a distance therethrough without contacting the weir plate 90. This may be useful, as the teeth of a cleaning rake (of certain designs) generally must extend some distance through the bar rack 90 to fully clear the rack of accumulated debris. It should also be appreciated that the plate 100 could be separated from the bar rack without the use of the members 102, and without any direct connection between the plate 100 and the rack 90. However, the use of the members 102 supports the plate 100 and prevents the cantilever forces which may otherwise develop by the flowing fluid.

Figure 9:
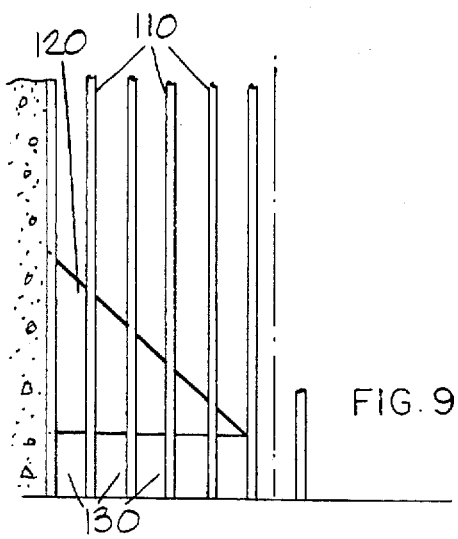
FIG. 9 is front elevation view of an embodiment of the invention with a plate spaced above a channel bottom.

Referring now to FIG. 9, a further embodiment is shown in a front elevation view similar to that of FIG. 6. A weir plate 120 is situated behind a bar rack 110, and may be of a triangular (or other) shape to effectively restrict the cross section of the channel 110. In this embodiment, the plate 120 is not attached to or adjacent the channel bottom (or sill plate), but instead is elevated a distance above the bottom. This results in an open space 130 between the bottom and the weir plate 120. The open space 130 will allow grit and similar substances to wash through bar rack, for proper downstream treatment. Without the open space 130, grit, which often has a specific gravity somewhat greater than that of water or similar fluid, may settle onto the channel bottom at the interface between the channel bottom and the weir plate.

The method of operation of use of all of the above embodiments is similar, and may be described in connection with the embodiment shown in FIG. 6. During times of relatively lower fluid flow, such as early in a the life cycle of a waste treatment plant, fluid may be allowed to flow through the channel 80 with the weir plate 100 in place, so that the fluid flow parameters will be within the desired range. If and when the fluid flow increases so that the fluid flow parameters are no longer within the desired range, the weir plate 100 may then be removed entirely or replaced with another weir, providing a greater effective cross section for the channel 80. The fluid stream may be allowed to flow unimpeded by any weir plate, or, depending on the increase in fluid volume, a smaller weir plate could be substituted for the weir plate 100.

Should fluid volume through the channel decrease rather than increase, the reverse of the above method may be followed. If the channel is being used without a weir plate, a weir plate may be added. Or, a smaller weir plate may be replaced with a larger weir plate. Many fluctuations between larger and smaller flows may occur, with the weir plate or plates being added or removed as needed.

Alternatively, a weir according to an embodiment described above may be attached to the channel in a non-removable manner, if it is anticipated that fluid volume will be relatively constant for an acceptably long period of time.

The above embodiments have described the weir plates according to the present invention as being attached to the bar screen, either directly or through spacing members. It should also be appreciated that the weir plates could be attached to the channel (bottom and/or sides). The plates could be attached to both the channel and the bar screen, either directly or through spacing members. An example of such a configuration is provided in FIG. 1 of application Ser. No. 08/735,525.

What is claimed is:

1. A device for controlling the velocity of fluid comprising:
    an intake channel of a fluid treatment plant, the channel having a bar rack or filtering screen allowing flow therethrough;
    a weir for controlling the flow through the bar rack or filtering screen, the weir having a plate substantially transverse to the channel; and
    means for attaching the weir within the channel to the bar rack or filtering screen.

2. The device of claim 1, further comprising means for attaching the weir to the channel.

3. The device of claim 1, wherein the plate is attachable to the bar rack or filter screen by a spacing panel, the spacing panel having an edge attachable to the plate and another edge attachable to the bar rack or filtering screen, whereby the plate is separated form the bar rack or filtering screen by the spacing panel.

4. The device of claim 1, wherein the channel has two sidewalls, the plate being attachable toward one sidewall; and further comprising a second plate positionable substantially transverse to the channel and being attachable to the bar rack toward the second sidewall.

5. The device of claim 1, further comprising a plurality of additional plates, each of the plurality of additional plates being separately detachable attachable to the bar rack or filtering screen or another of the plates, whereby the effective cross section of the channel is controlled by attaching the plate and a combination of the plurality of additional plates.

6. The device of claim 5, wherein at least some of the plates have widths differing from at least some of the other plates.

7. The device of claim 5, wherein the channel has a depth and a width, and wherein the plurality of additional plates have sizes that differ from one another and from the plate; the plate has a width greater than any of the plurality of additional plates; the plate is positionable with the channel at a greater depth than any of the plurality of additional plates; the plates being attachable at successively lesser depths, and the plates having successively less width, whereby the combination of all of the plates attached with the channel has a greater cross section at greater depths.

8. The device of claim 7, wherein each of the plates are attachable to the rack or screen, with the primary surface area of the plates spaced away from the rack or screen.

9. The device of claim 1, wherein the plate has a varying width along its cross section.

10. The device of claim 9, wherein the plate is substantially a triangle.

11. The device of claim 1, wherein the channel has a bottom and the plate is positioned so that a clear opening results between the channel bottom and the plate.

12. A method for controlling the velocity of fluid within an intake channel of a fluid treatment plant, the method comprising:
    attaching a weir to the channel, the weir having a plate that has a transverse component to the channel;
    attaching the plate to the screening bar rack within the channel, whereby the plate is stabilized by attachment to the rack.

13. The method of claim 12, wherein the weir is detachably attachable.

14. The method of claim 12, wherein the channel contains a back cleaned bar rack, and the weir is attachable upstream from the rack, thereby permitting the rack to be cleaned without interference from the weir.

15. The method of claim 12, further comprising attaching the plate to the channel, whereby the plate is stabilized by attachment to both the rack and the channel.

16. The method of claim 12, wherein the channel contains a front cleaned bar rack, and the weir is attachable downstream from the rack, thereby permitting the rack to be cleaned without interference from the weir.

17. The method of claim 12, further comprising the step of attaching an additional plate to at least one of the first plate and the rack, whereby the channel is further restricted.

18. The method of claim 17, wherein the channel has depth and a width, and the additional plate has dimensions such that the combination of the plate and the additional plate has a greater width at a greater depth within the channel.

19. The method of claim 18, further comprising the step of attaching an additional plurality of plates to at least one of the channel, the first plate, the additional plate, or the additional plurality of plates, wherein the plates are dimensioned and sized so that the combination of attached plates has a greater width at greater depths within the channel.

20. The method of claim 12, wherein the channel has a width and a depth, and the plate is dimensioned and attached so that the plate has a greater width at a greater depth within the channel.

21. The method of claim 12, wherein the channel has a bottom, and the plate is attached so that a clear space results between the channel bottom and the plate.

22. The method of claim 12, wherein the weir is sized so that the channel has a fluid flow rate of between 1.25 to 3.28 feet per second.

\* \* \* \* \*